UNITED STATES PATENT OFFICE.

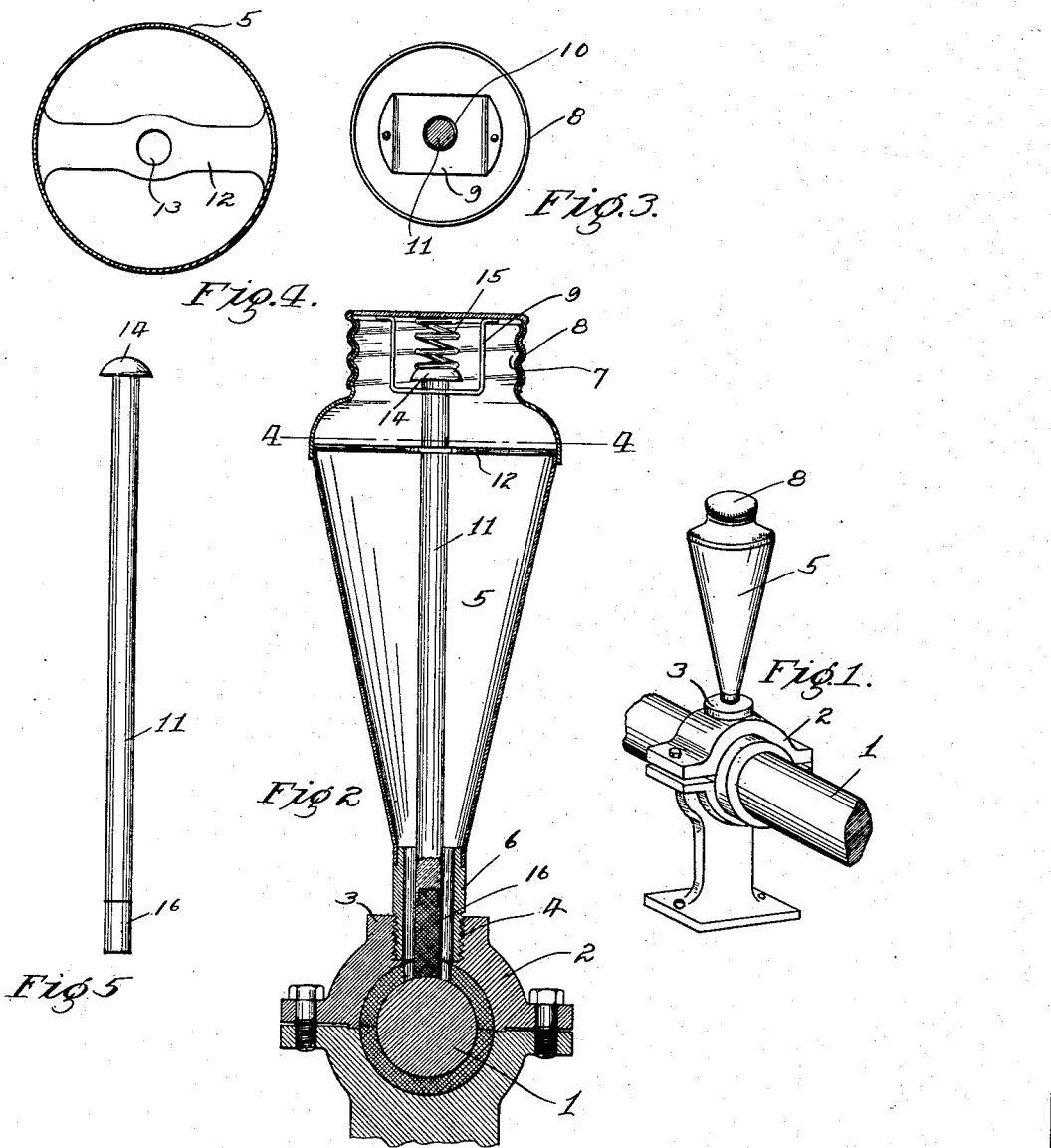

FREDERICK MILLER, OF OAKLAND, CALIFORNIA.

LUBRICATING GREASE-CUP.

1,172,383.  Specification of Letters Patent. Patented Feb. 22, 1916.

Application filed October 4, 1913. Serial No. 793,431.

*To all whom it may concern:*

Be it known that I, FREDERICK MILLER, a citizen of the United States, residing at No. 3010 Bona street, in the city of Oakland, county of Alameda, State of California, have invented a new and useful Lubricating Grease-Cup, of which the following is a specification.

This invention relates to improvements in grease cups and more particularly to a device for dispensing the heavy greases which are of such consistency that they do not flow by gravity. In the usual lubricator for greases compression is resorted to in order to force the lubricant into the bearings.

The principal object of my invention is to provide means for causing the lubricant to flow as required by the bearing, thus insuring a supply of lubricant when required and doing away with the necessity of depending on attendant to screw down the compression device of the grease cup.

Another object of my invention is to provide a member which rests on the shaft and transmits the heat from the latter to the heavy grease, this member being so formed as to obviate the danger of wearing a groove around the periphery of the shaft. I am aware that such heat transmitting members have been used in grease cups heretofore, but, these have been of such material that the constant pressure on the shaft would wear grooves in the periphery thereof.

With these and other objects in view my invention consists in the novel construction of the several parts as will be clearly set forth in the following description and more particularly pointed out in the appended claim.

Reference should be had to the accompanying drawing forming a part of this specification wherein, Figure 1 is a view in perspective showing my improved lubricator attached to a shaft bearing. Fig. 2 is an enlarged vertical section through the lubricator and bearing to which it is attached. Fig. 3 is a bottom plan view of the cap used thereon. Fig. 4 is a view in section on the line 4—4. Fig. 5 is a view in elevation of the pin used within the lubricator.

Referring to the corresponding parts by the same numerals of reference, 1 denotes a shaft journaled in the bearing 2 provided with a lug 3 on the upper side of the cap threaded interiorly as at 4.

My lubricator consists of the body portion 5 preferably of conical shape, having the tubular externally threaded lower end 6, which is screwed into engagement with the threads 4 in the cap of bearing 2. The upper end of the body portion is threaded as at 7 and in engagement therewith is a cap 8 having the downwardly extending U-shaped yoke 9, provided with an opening 10 centrally disposed with respect to the body portion and adapted to receive a pin 11. Within the body is a cross bar 12 provided with an opening 13 in alinement with the opening of yoke 9 and central with the body portion 5. Pin 11 also extends through this opening and on the upper end is provided with an enlarged head 14 on which is seated a spring 15. The pin is placed within the yoke before the latter is attached to the cap 8 and spring 15 is held in position by the lower coils encircling the head 14, the upper end resting against the inner surface of the cap. The lower portion of the pin resting on the shaft is provided with a tip 16 of Babbitt or other soft bearing metal.

In use the body portion is filled with grease, the pin 11 is pushed through this grease until the lower end rests on the shaft, in the meantime the cap 8 being screwed into place. The pin is of such length that the head 14 does not contact with the lower surface of yoke 9, thus the action of spring 15 is to press the pin end 16 against the shaft 1. As the latter rotates the friction generates heat which is transmitted through the soft metal point 16 to the pin 11, the body of which is of good heat conducting material. This causes the grease in the body portion to melt and run down through the annular space between the pin end and nipple 6.

It will be apparent that if the shaft is running with little friction not much heat will be generated, consequently, little grease will be melted and fed to the bearing. If, however, the bearing is dry considerable heat will be generated and a greater amount of oil will be melted and fed to the bearing. Thus to a great measure the grease is fed automatically according to the requirements of the bearing.

While I have shown the preferred construction of my invention it will be understood that various changes within the scope of the claim can be made without departing from the spirit of my invention.

What I claim as new and wish to cover by Letters Patent is:—

An automatic lubricating cup for shaft bearings comprising in combination a hollow conical body portion, a threaded nipple on the small end of said body portion adapted to engage said bearing, a guide bar extending across the large end of said body portion, a reduced neck having screw threads thereon, a screw threaded cap adapted to fit said neck, a U-shaped yoke attached to the inside of said cap, said guide bars and said yoke having alining openings therethrough, a pin extending through said openings with the lower end thereof resting on the shaft of said bearing, an enlarged head on said pin seated within said yoke, and a spring interposed between said head and said cap.

In testimony whereof I have affixed my signature in the presence of two witnesses.

FREDERICK MILLER.

Witnesses:
 EDGAR HARVEY ELLSWORTH,
 THOMAS HOLDEN.

Copies of this patent may be obtained for five cents each, by addressing the "Commissioner of Patents, Washington, D. C."